July 20, 1965

L. A. HARRIS ETAL 3,196,043

METHOD FOR MAKING AN ELECTRODE STRUCTURE

Filed May 17, 1961

→ TO VACUUM PUMP

INVENTORS.
LAWRENCE A. HARRIS &
ARTHUR N. DETOMMASI
BY *Nathan Jcornfeld*
THEIR ATTORNEY United States Patent Office 3,196,043
Patented July 20, 1965

3,196,043
METHOD FOR MAKING AN ELECTRODE STRUCTURE
Lawrence A. Harris, Scotia, and Arthur N. De Tommasi, Newtonville, N.Y., assignors to General Electric Company, a corporation of New York
Filed May 17, 1961, Ser. No. 110,823
8 Claims. (Cl. 117—212)

This invention relates to laminated structures and to a method of making a laminated structure in which the layers are electrically insulated from each other and mechanically aligned.

The structure and method of the invention may be employed in a great variety of applications; however, it has been found that the method is particularly advantageous in making a laminated electrode such as a double-grid structure for electrical applications.

For the purposes of this application, a double-grid structure may be defined as a structure having two apertured electrically conductive layers that are mechanically aligned and separated by a layer of electrical insulation. Prior art methods of producing such structures require suspending or mounting two identical grids and maintaining perfect alignment. The method disclosed herein eliminates this problem; and since most grid electrodes are thin, difficult to handle, delicate members, the avoidance of this difficulty is particularly advantageous.

In addition to eliminating many of the technical problems in producing a double-grid structure, the method of the invention substantially reduces manufacturing costs.

Accordingly, it is a principal object of the present invention to provide an improved laminated structure and a simplified method for producing the same.

It is a further object of the invention to provide a method of making a laminated electrode structure in which a few, relatively inexpensive steps are required.

Another object of the invention is to provide a novel double-grid electrode structure in which two metallic layers having similar patterns of apertures are mechanically aligned and electrically insulated.

Briefly stated, the invention contemplates producing a laminated structure particularly useful for electrodes, and comprising two conductive layers of metal or the like that are electrically insulated and mechanically aligned. As a first step of the method of the invention, a coating of insulation is applied to one side of a conductive member having a predetermined pattern of apertures formed thereon. Suitable plugs are then placed in the apertures on the insulation side of the member, and thereafter a layer of conductive material, such as metal, is applied to the surface formed by the insulation and the plugs. Lastly, the plugs are removed from the apertures, leaving an integral laminated structure with the desired formation of two conductive layers separated by an insulating layer.

Further objects, features and advantages of the invention will be apparent with reference to the following specification and drawings in which.

Figure 1:
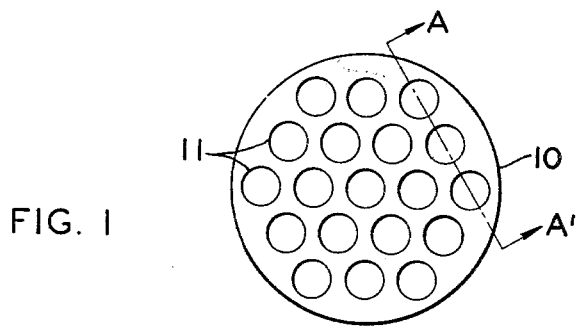
FIG. 1 shows a plan view of a metal grid member in the form before treatment by the method of the invention.
Figure 2:
FIG. 2 shows a cross-sectional view of the grid of FIG. 1 taken along the line A—A.

Referring now to the drawings, FIGS. 1 and 2 show a relatively thin, electrically conductive member 10 of metal such as molybdenum or the like having a predetermined pattern of apertures 11 formed therein, which apertures may be of circular form and of very small diameter, say of the order of 0.004 to 0.010 inch, the apertured area being any desired predetermined portion, say approximately 50% of the area of the member, as desired or required. The member 10 is here shown as of circular form in plan, it being understood that any desired shape can be employed, and it may be taken to represent a grid electrode or any other such conductive member. The manner of making the member 10, per se, is not a part of the invention. Likewise, the manner of forming the apertures 11 is, in and of itself, not a part of this invention, and any suitable technique such as photo-etching can be used.

Figure 3:
FIG. 3 shows a similar cross-sectional view of the grid of FIG. 1 after a coating of insulation has been applied to one side of the grid in accordance with a step of the method of the invention.

In accordance with the method of the invention, a coating of insulation is applied to one side of member 10 by any suitable means such as spraying. FIG. 3 shows a cross-section of member 10 after it has received a coating of insulation 12 on one side. A suitable insulation material for this purpose is the conventional alumina spray solution commonly employed in the manufacture of heater elements of indirectly heated cathodes, although other suitable insulation material can be used. The wetness of the spray results in a tapered thickness or convex meniscular shape of coating adjacent the apertures, as indicated in FIG. 3.

Figure 4:
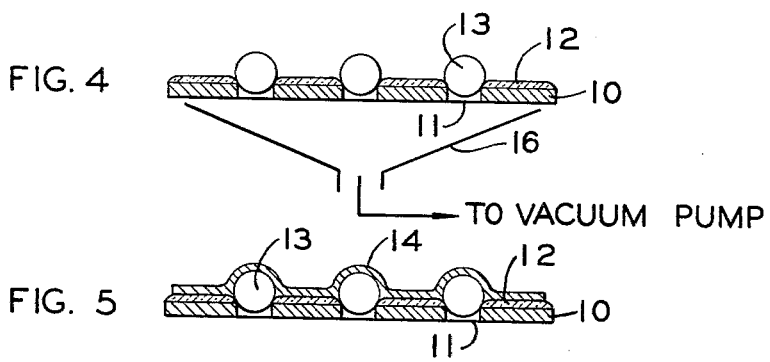
FIG. 4 shows the grid of FIG. 3 after plugs have been placed in the grid apertures in accordance with another step of the method.

The insulation coating is dried and hardened as by sintering in a hydrogen furnace and thereafter a plurality of plugs such as glass balls 13, having a diameter slightly larger than aperture 11, are sprinkled onto the insulation side of grid 10, as shown in FIG. 4. Although the balls 13 have been described as being glass, it should be understood that they may be of any suitable material which does not chemically react with the insulation coating 12 or the material to be described hereinafter. For thin, delicate structures having very small apertures, it may be somewhat difficult to position one ball 13 in each aperture 11 without mechanical assistance. To facilitate this operation, vacuum means 16 may be applied to the side of grid 10 opposite the insulation side, as shown schematically in FIG. 4. The reduced pressure provided by the vacuum means will tend to hold one ball 13 in each aperture 11, and any excess balls may then be removed by any suitable means such as brushing with a soft brush (not shown).

Figure 5:
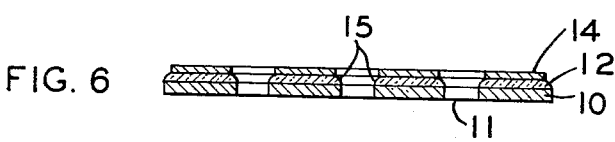
FIG. 5 shows the grid of FIG. 4 after a layer of metal has been applied in accordance with still another step of the method of the invention.

With the balls 13 in place and plugging each of the apertures 11, a thin coating 14 of conducting material, such as molybdenum or other suitable metal, is applied to the insulation side of grid 10, as shown in FIG. 5. This coating may be applied by any suitable means; and in a preferred form of the invention, the grid 10 carrying the balls 13 is placed within a vacuum container, such as a bell jar, and metal is vacuum-evaporated or sputtered onto the balls and the insulating coating. The evaporated or sputtered metal is prevented from depositing on the edge of insulation 12 during the coating operation by suitable masking of the edge. Since this method of applying metal coatings is well known in the art, a detailed description is not necessary and the apparatus employed is not shown in the drawings.

After the conductive coating 14 has hardened, the balls 13 may be readily removed by merely inverting the structure 10 and allowing the balls to drop out and into a suitable container therefor. This method of removal of the balls is feasible, inasmuch as the coating applied is very thin and possesses only slight mechanical strength.

Figure 6:
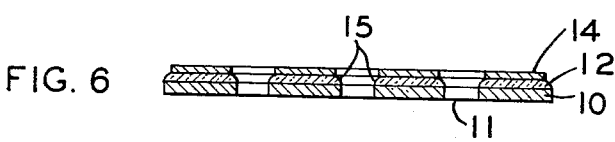
FIG. 6 shows a cross-sectional view of a two layer grid structure constructed in accordance with the method of the invention.

As can be seen in FIG. 6, removing the balls 13 and the conductive coating portions adhering thereto leaves a layer of metal 14 having a pattern of apertures which is identical to and mechanically aligned with the apertures in structure 10.

The effect of the balls 13 resting on the insulation 12 during the sputtering operation is to produce a ring of insulation 15 around each aperture, which is not covered or coated by metal. Consequently, the metallic layers 10 and 14 are positively electrically insulated from each other.

As previously mentioned, the method of the invention is not limited to the precise arrangement shown and heretofore described. For example, the pattern of apertures in structure 10 can be in the form of a plurality of slits of any desired shape and dimension which can be plugged by means of suitably shaped plug members resting in the slits which they would be plugging. Also, the apertures could be of any other shape that can be provided with suitable plugs. Likewise, the shape of structure 10, as shown in FIG. 1, is merely an example, and it should be understood that it could be of shape other than circular.

In the foregoing description of the invention certain specific materials were mentioned as suitable for the metallic conducting members and for the insulation. Inasmuch as the invention is not limited to these specific materials, e.g., molybdenum for the metallic portions and alumina for the insulation, it will be understood that other materials having similar electrical and mechanical properties can be used. Also, the particular method described is merely an example of the invention, and it will be obvious to those skilled in the art that various changes and modifications may be made without departing from the invention in its broader aspects. For example, in addition to the variations in shapes and materials previously mentioned, it is obvious that any number of layers of metal and insulation could be applied so as to make a laminar structure of any thickness desired. Also, the use of a vacuum may be dispensed with, particularly if the apertures and plugs are of sufficient size to permit easy manipulation of the plugs.

Therefore, it is intended in the appended claims to cover all such changes and modifications as fall within the true spirit and scope of the invention.

Having thus described the invention, what we claim as new and desire to secure by Letters Patent of the United States is:

1. The method of making a structure in which successive layers are electrically insulated from each other and mechanically aligned, comprising the steps of applying a coat of insulation to one side of an electrically conductive member having a predetermined pattern of apertures, placing plugs in said apertures on the insulation side of said member, thereafter coating said insulation with a layer of electrically conductive material and removing said plugs.

2. The method of making a structure comprising the steps of applying a coating of insulation to one side of a metal member having a pattern of apertures, placing plugs in the apertures from the insulation side of the member, thereafter applying a layer of metal to the insulation side of the member, and removing the plugs from the apertures to thereby form a structure comprising two metal layers that are electrically insulated and mechanically aligned.

3. The method of making a structure in which the layers are electrically insulated from each other and mechanically aligned comprising the steps of applying a coating of insulation to one side of an electrically conductive member having a pattern of apertures, placing plugs in said apertures on the insulation side of said member, applying a vacuum to the opposite side of said member to hold said plugs in said apertures, thereafter coating said insulation with a layer of conductive material, and removing said plugs.

4. A method of making an integral electrode structure in which the layers are electrically insulated from each other and mechanically aligned including the steps of applying a coating of insulation to one side of a metal member having a pattern of circular apertures, plugging each of said apertures from the insulated side of said member with a ball of a diameter somewhat larger than the diameter of said apertures, coating the insulation with a layer of metal, and removing said balls.

5. The method of making an electrode structure comprising the steps of applying a coating of insulation to one side of a metal member having a pattern of circular apertures, plugging each of said apertures from the insulation side of said member with a ball, applying a vacuum to the opposite side of said member to hold said balls in said apertures, applying a layer of metal to the surface formed by said insulation and said balls, and removing said balls from said apertures to thereby form an integral electrode structure comprising two metal layers that are electrically insulated and mechanically aligned.

6. The method of making an electrode structure comprising the steps of applying a coating of insulation to one side of a metal member having a pattern of apertures, hardening said coating, placing plugs in said apertures from the insulated side of said member, placing the member with said plugs into a vacuum container, evaporating metal within the container and depositing it upon the insulated side of said member, and removing the plugs from said apertures to thereby form an electrode structure comprising two metal layers that are electrically insulated and mechanically aligned.

7. The method of making an electrode structure comprising the steps of applying a coating of insulation to one side of a metal member having a pattern of apertures, hardening said coating, placing plugs in said apertures from the coated side of said member, applying a vacuum to the opposite side of said member so that one plug is held in each aperture, placing said member with the plugs into a vacuum container, evaporating metal within the container and depositing it upon the insulated side of said member, and removing the plugs from the apertures to thereby form an electrode structure comprising two metal layers that are electrically insulated and mechanically aligned.

8. The method of making an electrode structure comprising the steps of applying a coating of insulation onto one side of a metal member having a pattern of circular apertures, plugging said apertures by sprinkling balls slightly larger than said apertures onto the insulated side of said member and applying a vacuum to the opposite side of said member so that one ball is held in each aperture, removing excess balls, placing the member with the balls into a vacuum container, evaporating metal within the container and depositing it upon the insulated side of said member, and removing the balls from the apertures to thereby form a structure comprising two metal layers that are electrically insulated and mechanically aligned.

(References on following page)

References Cited by the Examiner

UNITED STATES PATENTS

| | | | |
|---|---|---|---|
| 647,088 | 4/00 | Hammond | 118—504 |
| 2,733,166 | 1/56 | Schoenfeldt et al. | 117—38 |
| 2,921,363 | 1/60 | Nielsen | 29—25.14 |
| 2,936,392 | 5/60 | Grimone et al. | 313—348 |
| 2,946,915 | 7/60 | Haase | 313—348 |
| 2,966,647 | 12/60 | Lentz | 338—32 |
| 2,980,984 | 4/61 | Shrader et al. | 29—25.14 |
| 3,002,847 | 10/61 | Shaffer et al. | 117—212 |
| 3,100,723 | 8/63 | Weed | 117—217 |
| 3,115,423 | 12/63 | Ashworth | 117—217 |

RICHARD D. NEVIUS, *Primary Examiner.*

RALPH G. NILSON, *Examiner.*